United States Patent
Ravella et al.

(10) Patent No.: US 11,755,558 B2
(45) Date of Patent: Sep. 12, 2023

(54) TRANSACTION IDENTIFIER LOCKING WITH DATA ROW LOCKS

(71) Applicant: Microsoft Technology Licensing, LLC, Redmond, WA (US)

(72) Inventors: Chaitanya Sreenivas Ravella, Bellevue, WA (US); Prashanth Purnananda, Bellevue, WA (US); Raghavendra Thallam Kodandaramaih, Redmond, WA (US); Peter Byrne, Charlotte Hall, MD (US); Hanumantha Rao Kodavalla, Sammamish, WA (US); Girish Mittur Venkataramanappa, Redmond, WA (US); Panagiotis Antonopoulos, Redmond, WA (US); Adrian-Leonard Radu, Sammamish, WA (US); Wei Chen, Sammamish, WA (US); Craig Steven Freedman, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 132 days.

(21) Appl. No.: 17/358,773

(22) Filed: Jun. 25, 2021

(65) Prior Publication Data
US 2022/0414081 A1    Dec. 29, 2022

(51) Int. Cl.
G06F 16/00        (2019.01)
G06F 16/23        (2019.01)

(52) U.S. Cl.
CPC ...... *G06F 16/2343* (2019.01); *G06F 16/2365* (2019.01); *G06F 16/2379* (2019.01)

(58) Field of Classification Search
None
See application file for complete search history.

(56) References Cited

U.S. PATENT DOCUMENTS

2008/0086470 A1 *  4/2008  Graefe .............. G06F 16/2343
2013/0060742 A1 *  3/2013  Chang .............. G06F 16/1774
                                                      707/704
(Continued)

FOREIGN PATENT DOCUMENTS

CN        108363806 B       7/2020
WO        WO-9627157 A1 *   9/1996    .......... G06F 11/1471

OTHER PUBLICATIONS

"International Search Report and Written Opinion Issued in PCT Application No. PCT/US22/029093", dated Aug. 1, 2022, 11 Pages.

(Continued)

*Primary Examiner* — Syed H Hasan
(74) *Attorney, Agent, or Firm* — Alleman Hall Creasman & Tuttle LLP (57) ABSTRACT

A computing device is provided, including non-volatile memory storing a database including a table having a plurality of rows. The computing device may further include a processor configured to receive a request to perform a first transaction on a row. The processor may assign a first transaction identifier (TID) of the first transaction to the row. The processor may impose a first exclusive TID lock on the first TID of the row and may impose a first exclusive data lock associated with the first transaction on the row. The processor may perform the first transaction on the row. Performing the first transaction may include modifying the table as stored in the memory. In response to completing the first transaction, the processor may release the first exclusive data lock on the row and release the first exclusive TID lock on the first TID of the row.

18 Claims, 8 Drawing Sheets

(56) References Cited

U.S. PATENT DOCUMENTS

| | | | |
|---|---|---|---|
| 2014/0279960 A1* | 9/2014 | Marwah | G06F 16/221 707/703 |
| 2020/0034251 A1* | 1/2020 | Antonopoulos | G06F 11/1469 |
| 2021/0042284 A1* | 2/2021 | Kanthak | G06F 16/2358 |

OTHER PUBLICATIONS

Antonopoulos, et al., "Constant Time Recovery in Azure SQL Database", In Proceedings of the VLDB Endowment, vol. 12, Issue 12, Jun. 2019, 12 Pages.

Antonopoulos, et al., "Socrates: The New SQL Server in the Cloud", In Proceedings of the International Conference on Management of Data, Jun. 30, 2019, 14 Pages.

Berenson, et al., "A Critique of ANSI SQL Isolation Levels", In Proceedings of the ACM SIGMOD International Conference on Management of Data, Jun. 1995, 13 Pages.

Cahill, et al., "Serializable Isolation for Snapshot Databases", In Proceedings of the ACM SIGMOD International Conference on Management of Data, Jun. 9, 2008, pp. 729-738.

Fekete, et al., "A Read-Only Transaction Anomaly Under Snapshot Isolation", In Journal of ACM SIGMOD Record, vol. 33, Issue 3, Sep. 2004, pp. 12-14.

Fitzpatrick, Anne, "A Well-intentioned Query and the Halloween Problem", In Journal of Annals of the History of Computing, vol. 24, Issue 2, Apr. 2002, pp. 86-93.

Freedman, Craig, "Halloween Protection", Retrieved From: https://docs.microsoft.com/en-us/archive/blogs/craigfr/halloween-protection, Feb. 27, 2008, 5 Pages.

Graefe, Goetz, "On Transactional Concurrency Control", In Journal of Synthesis Lectures on Data Management, vol. 14, Issue 5, Jun. 2019.

Korotkevitch, Dmitri, "Pro SQL Server Internals", Published by Apress, 2016, 805 Pages.

Kyte, Thomas, "Expert Oracle", In Publication of A-Press, 2005.

Mohan, C, "An Efficient Method for Performing Record Deletions and Updates Using Index Scans", In Proceedings of the 28th International Conference on Very Large Data Bases, Aug. 20, 2002, 10 Pages.

Mohan, C, "ARIES/KVL: A Key-Value Locking Method for Concurrency Control of Multiaction Transactions Operating on B-Tree Indexes", In Proceedings of the 16th International Conference on Very Large Data Bases, Aug. 13, 1990, pp. 392-405.

Mohan, et al., "ARIES/IM: An Efficient and High Concurrency Index Management Method Using Write-Ahead Logging", In Proceedings of the ACM SIGMOD International Conference on Management of Data, Jun. 2, 1992, pp. 371-380.

Mohan, C, "Commit_LSN: A Novel and Simple Method for Reducing Locking and Latching in Transaction Processing Systems", In Proceedings of the 16th International Conference on Very Large Data Bases, Aug. 13, 1990, pp. 406-418.

Ponnekanti, Nagavamsi, "Pseudo Column Level Locking", In Proceedings of 17th International Conference on Data Engineering, Apr. 2, 2001, pp. 545-550.

Ports, et al., "Serializable Snapshot Isolation in PostgreSQL", In Proceedings of 38th International Conference on Very Large Data Bases, Aug. 27, 2012, pp. 1850-1861.

White, Paul, "The Halloween Problem", Retrieved From: https://sqlperformance.com/2013/02/t-sql-queries/halloween-problem-part-1, Feb. 13, 2013, 32 Pages.

* cited by examiner

TRANSACTION IDENTIFIER LOCKING WITH DATA ROW LOCKS

BACKGROUND

In a relational database, multiple transactions on tables included in the relational database may be processed concurrently. These transactions may, for example, include instructions to insert a row, delete a row, read the values included in a row, or modify the values included in a row. Concurrently performing two or more transactions on at least partially overlapping portions of a relational database may sometimes result in unintended behavior due to interactions between the effects of the transactions.

In order to avoid unintended behavior when two or more transactions are concurrently performed on a table, locking may be used. A transaction may take a lock on a row, a page (a physical region of memory in which data included in the table is stored), or a table. While a row, page, or table is subject to a lock, access to the row, page, or table by other transactions may be restricted. A lock may, for example, be an exclusive (X) lock, a shared (S) lock, an update (U) lock, an intent exclusive (IX) lock, an intent shared (IS) lock, or an intent update (IU) lock.

When a row, page, or table is subject to an exclusive lock, that row, page, or table is inaccessible to transactions other than the transaction that holds the exclusive lock.

When a row, page, or table is subject to a shared lock, that row, page, or table is in a read-only mode for the transaction that holds the shared lock. That row, page, or table is inaccessible to transactions that would modify the row, page, or table. Multiple transactions may concurrently hold S locks on a row, page, or table.

An update lock on a row, page, or table behaves similarly to a shared lock while one or more shared locks on the row, page, or table are held by one or more other transactions, but is converted into an exclusive lock when the row, page or table needs to be modified. For example, a U lock on a row indicates that the current transaction can potentially modify the row, and blocks access to the row to other transactions that may modify the row. At row modification time, the U lock is converted into an X lock. The U lock is compatible with an S lock but not with another U lock. Thus, while the transaction holds the U lock on the row, other transactions that use S locks may access the row, while other transactions that use U locks may be prevented from accessing the row.

When a transaction takes an intent exclusive lock, an intent shared lock, or an intent update lock on a page or table, that transaction reserves the page or table for later imposition of an exclusive lock, shared lock, or update lock, respectively. Locks on tables, pages, and rows have a hierarchy in which an X row lock has an IX page lock and an IX table lock as prerequisites. Similarly, an S row lock has an IS page lock and an IS table lock as prerequisites.

SUMMARY

According to one aspect of the present disclosure, a computing device is provided, including non-volatile memory storing a database including a table having a plurality of rows. The computing device may further include a processor configured to receive a request to perform a first transaction on a row of the plurality of rows. The processor may be further configured to assign a first transaction identifier (TID) of the first transaction to the row. The processor may be further configured to impose a first exclusive TID lock on the first TID of the row. The processor may be further configured to impose a first exclusive data lock associated with the first transaction on the row. The processor may be further configured to perform the first transaction on the row. Performing the first transaction may include modifying the table as stored in the memory. In response to completing the first transaction, the processor may be further configured to release the first exclusive data lock on the row and release the first exclusive TID lock on the first TID of the row.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In existing implementations of locking for relational databases, locks may be imposed for indices associated with columns of a table. An index for a column may indicate a sorted ordering for the entries included in the column. The entries of the column for which the index is generated are referred to as the key values for the index. An index may be a clustered index, in which rows are physically stored in the memory in the sorted ordering, or may alternatively be a non-clustered index, in which the index is stored as a plurality of pointers to the rows of the table. In examples in which a table does not have a clustered index, the rows of the table may be stored in a heap. For either a clustered index or a non-clustered index, the key values of the index may be organized in a B-tree.

When index-specific locking is performed, large amounts of memory may be required to store the locks associated with transactions. The locks associated with a transaction may include an intent exclusive lock on the table, a respective intent exclusive lock for a corresponding leaf page of each index, and a respective exclusive lock for each row for each index. In one example, a table emp may have a clustered index on id, a non-clustered index on firstname, and a non-clustered index on lastname. Inserting a row into the table emp may include taking the following locks:

1. An IX lock on emp
2. An IX lock on the clustered index leaf page for id
3. An X lock on the clustered index key of the index on id
4. An IX lock on the non-clustered index leaf page for firstname
5. An X lock on the non-clustered index key of the index on firstname
6. An IX lock on the non-clustered index leaf page for lastname, and
7. An X lock on the non-clustered index key of the index on lastname.

Accordingly, inserting a row into the table emp may involve taking seven locks. When a transaction is performed on a table with a large number of rows and a large number of indices, storing the locks associated with even a simple transaction such as inserting a row may use large amounts of memory. Taking a large number of locks may also trigger lock escalation, as discussed in further detail below, which may prevent transactions from being performed concurrently and may therefore increase the amount of time spent performing multiple transactions on the table.

In addition, when index-specific locking is used, lock acquisition order may differ among operations. A deadlock between two or more transactions may occur when the two or more transactions prevent each other from being performed due to the locks taken by the transactions. For example, a delete transaction configured to be performed on a row may acquire an X lock on a clustered index key and then acquire an X lock on a non-clustered index key. When another transaction is configured to update the same row, that transaction may acquire a U lock on a non-clustered index key and then acquire an X lock on the clustered index key. Thus, a deadlock may occur when the delete transaction has the X lock on the clustered index key but the update transaction has the U lock on the non-clustered index key.

Figure 1:
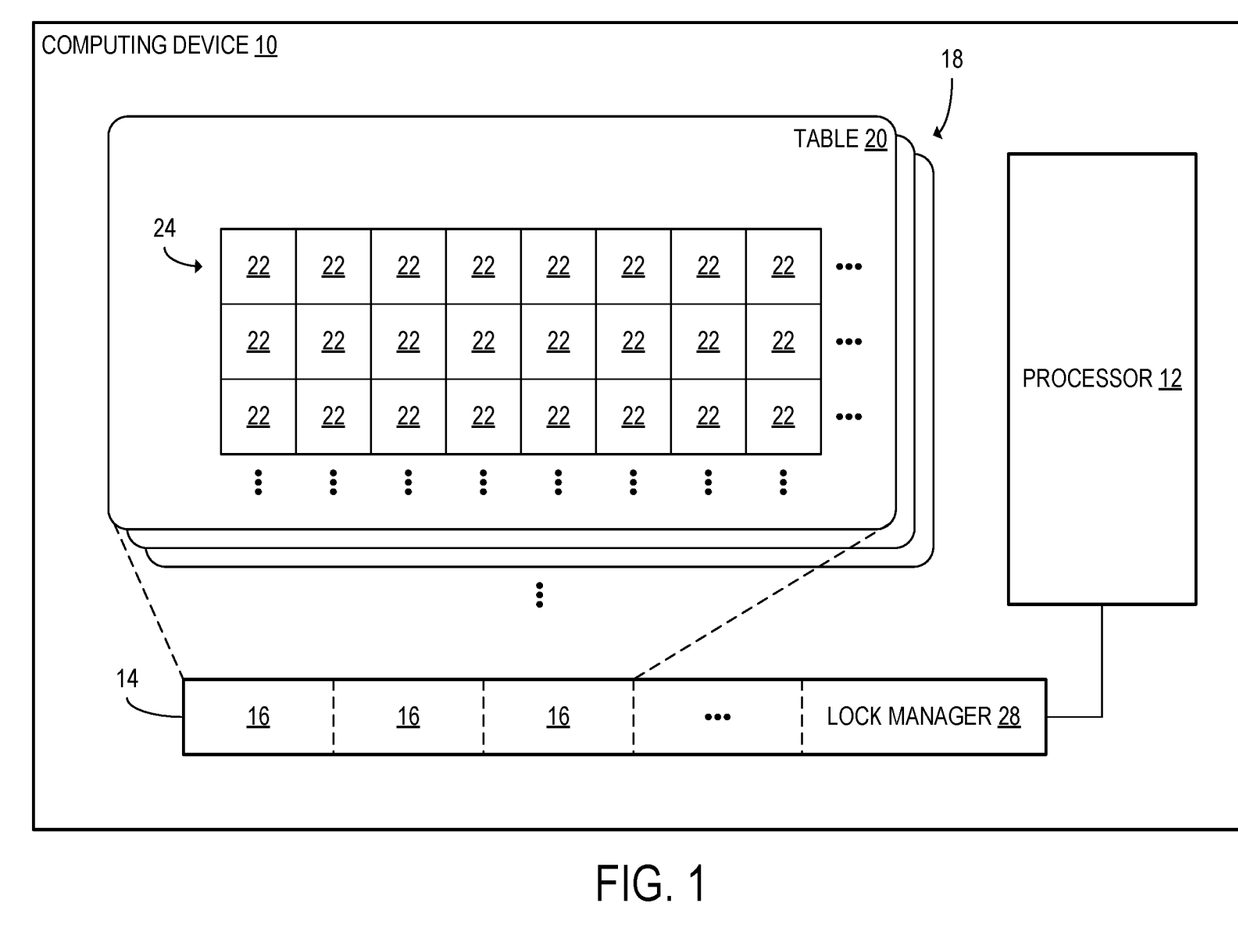
FIG. 1 schematically depicts an example computing device including memory storing a database, according to one embodiment of the present disclosure.

In order to address the challenges illustrated by the above examples, a computing device 10 is provided, as depicted schematically in FIG. 1 according to one example embodiment. The computing device 10 may include memory 14 storing a database 18. The memory 14 may include volatile memory such as random-access memory (RAM) and may further include non-volatile storage (e.g. disk storage). For example, data included in the database 18 may be stored in non-volatile storage and may be read into volatile memory when processing is performed on the data. The database 18 may be a relational database such as a Structured Query Language (SQL) database. The database 18 may include a table 20 having a plurality of rows 24. The rows 24 of the database 18 may each include a plurality of entries 22. In some examples, a plurality of tables 20 may be included in the database 18. The database 18 may be stored in the memory 14 in a plurality of pages 16, which may be physical regions of the memory 14 that have a predetermined size. The memory 14 may further store a lock manager 28, which may be a data structure that indicates each lock that is held for the database 18.

The computing device 10 may further include a processor 12 that is coupled to the memory 14 such that data may be transmitted between the memory 14 and the processor 12. In the example of FIG. 1, the processor 12 and memory 14 are shown within a single physical computing device. In some examples, the processor 12 and the memory 14 may be integrated into a single physical component, such as a system-on-a-chip (SoC). In other examples, the functionality of the processor 12 and/or the memory 14 may be distributed across a plurality of communicatively coupled physical computing devices. The plurality of physical computing devices may, in such examples, be a plurality of server computing devices located in a data center.

Figure 2:
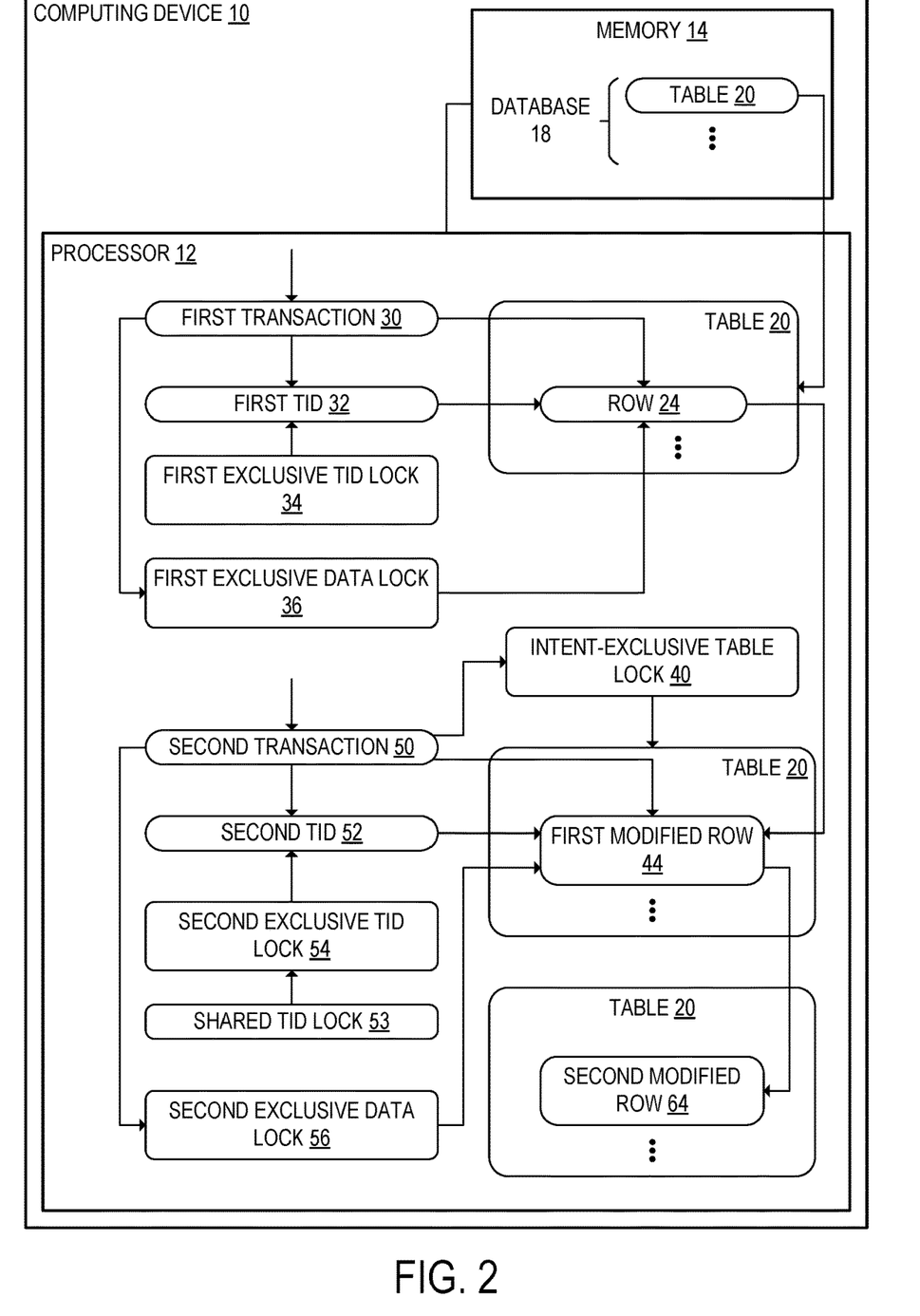
FIG. 2 schematically shows the computing device when the processor receives requests to perform a first transaction and a second transaction on a row of a table included in the database, according to the example of FIG. 1.

FIG. 2 schematically shows the processor 12 of the example computing device 10 of FIG. 1 in additional detail. As depicted in the example of FIG. 2, the processor 12 may be further configured to receive a request to perform a first transaction 30 on a row 24 of the plurality of rows 24 included in the table 20. In some examples, the first transaction 30 may be configured to be performed on two or more of the rows 24 of the table 20. The first transaction 30 may, for example, be configured to insert a row into the table 20, delete a row from the table 20, modify one or more of the entries 22 stored in the row 24, or read one or more of the entries 22 stored in the row 24 as one or more outputs to convey to another program. Additionally or alternatively to the above examples, the processor 12 may be configured to perform one or more other operations at least in part by executing the first transaction 30. The request to perform the first transaction 30 may, for example, be received from another program executed at the processor 12.

The processor 12 may be further configured to assign a first transaction identifier (TID) 32 of the first transaction 30 to the row 24. In examples in which the processor 12 is configured to perform the first transaction 30 on one or more rows 24, the processor 12 may be configured to assign the first TID 32 to each of the one or more rows 24. The first TID 32 may be stored in the memory 14 as metadata associated with the row 24.

The processor 12 may be further configured to impose a first exclusive TID lock 34 on the first TID 32 of the row 24. The first exclusive TID lock 34 may prevent other transactions from accessing the row 24 associated with the first TID 32 while the first exclusive TID lock 34 is held. In addition, the processor 12 may be further configured to impose a first exclusive data lock 36 associated with the first transaction 30 on the row 24. The first exclusive data lock 36 may prevent other transactions from being performed on the row 24 while the first transaction 30 holds the first exclusive data lock 36. Data locking uses one lock per row 24 that is configured to protect the row 24 across each index of the table 20. By using one lock per row 24, data locking may avoid deadlocks due to order of the locks taken by first transaction 30 in different indices. In addition, data locking may reduce the number of locks taken to modify the row 24. Data encoding the first exclusive TID lock 34 and the first exclusive data lock 36 may be stored at the lock manager 28 in the memory 14.

While the first transaction 30 holds the first exclusive TID lock 34 and the first exclusive data lock 36, the processor 12 may be further configured to perform the first transaction 30 on the row 24. Performing the first transaction 30 may include modifying the table 20 as stored in the memory 14. For example, the processor 12 may be configured to delete the row 24 from the table 20, insert a new row into the table 20 above or below the row 24, or edit one or more respective values of the one or more entries 22 included in the row. In some examples, the processor 12 may be configured to modify the table 20 such that the table 20 includes a first modified row 44 by performing the first transaction 30 on the row 24. In other examples, the processor 12 may be configured to move or delete the row 24 when the first transaction 30 is performed.

In response to completing the first transaction 30, the processor 12 may be further configured to release the first exclusive data lock 36 on the row 24. In addition, the processor 12 may be further configured to release the first exclusive TID lock 34 on the first TID 32 of the row 24. Thus, the row 24 may become modifiable by other transactions. In some examples, the first exclusive data lock 36 may be a short-duration lock that is acquired immediately before the first transaction 30 is performed on the row 24 and is released immediately after the first transaction 30 is performed on the row 24.

In some examples, subsequently to imposing the first exclusive TID lock 34 and the first exclusive data lock 36 and prior to completing the first transaction 30, the processor 12 may be further configured to receive a request to perform a second transaction 50 on the row 24. The request to perform the second transaction 50 may, for example, be received from another program executed at the processor 12. The processor 12 may be further configured to wait to perform the second transaction 50 until the first exclusive TID lock 34 and the first exclusive data lock 36 have been released by the first transaction 30.

In some examples, the request to perform the second transaction 50 may include a request to impose a shared TID lock 53 on the first TID 32. In such examples, the processor 12 may be further configured to impose the shared TID lock 53 on the first TID 32 in response to releasing the first exclusive TID lock 34.

In response to releasing the first exclusive TID lock 34 and the first exclusive data lock 36, the processor 12 may be further configured to perform the second transaction 50 on the row 24. In examples in which the second transaction 50 obtains a shared TID lock 53 on the first TID 32, the processor 12 may be configured to perform the second transaction 50 subsequently to imposing the shared TID lock 53. Performing the second transaction 50 may include modifying the table 20 as stored in the memory 14. Similarly to the first transaction 30, the second transaction 50 may be configured to insert a new row, delete the row 24, modify one or more entries 22 included in the row 24, or perform some other operation on the table 20 related to the row 24. In some examples, by performing the second transaction 50, the processor 12 may be configured to generate a second modified row 64. In other examples, the second transaction 50 may move or delete the row 24.

When the processor 12 begins performing the second transaction 50, the processor 12 may be further configured to assign a second TID 52 associated with the second transaction 50 to the row 24. The second TID 52 may overwrite the first TID 32 in the metadata associated with the row 24. Subsequently to assigning the second TID 52 to the row 24, the processor 12 may be further configured to impose a second exclusive TID lock 54 associated with the second transaction 50 on the second TID 52. In addition, the processor 12 may be further configured to impose a second exclusive data lock 56 associated with the second transaction 50 on the row 24. Data encoding the second exclusive TID lock 54 and the second exclusive data lock 56 may be stored at the lock manager 28 in the memory 14. The processor 12 may be configured to perform the second transaction 50 on the row 24 subsequently to imposing the second exclusive TID lock 54 and the second exclusive data lock 56.

In response to completing the second transaction 50, the processor 12 may be configured to release the second exclusive data lock 56 on the row 24. In addition, the processor 12 may be further configured to release the second exclusive TID lock 54 on the second TID 52 in response to completing the second transaction 50. Thus, the processor 12 may be configured to allow other transactions to access the row 24. The second exclusive data lock 56 may, in some examples, be a short-duration lock that is acquired immediately before the second transaction 50 is performed on the row 24 and is released immediately after the second transaction 50 is performed on the row 24.

The first transaction 30 and the second transaction 50 may, in some examples, each have a serializable isolation level. The serializable isolation level is an isolation level for a transaction in which each read lock and each write lock acquired by the transaction is released only when the transaction is completed. The serializable isolation level may prevent phantom reads by acquiring range data locks. In addition, in a transaction that uses the serializable isolation level, read locks and write locks may be held for the duration of the transaction rather than being short-duration locks.

In some examples, the processor 12 may be further configured to impose an intent-exclusive table lock 40 on the table 20 prior to performing the second transaction 50 on the row 24. The intent-exclusive table lock 40 may be stored in the memory 14 at the lock manager 28. The intent-exclusive table lock 40 may be held by the second transaction 50, and may, for example, be used when the second transaction 50 is performed at a high isolation level. By imposing the intent-exclusive table lock 40, the processor 12 may be configured to reserve an exclusive lock on the table 20. The processor 12 may be further configured to convert the intent-exclusive table lock 40 into an exclusive lock on the table 20 subsequently to releasing the first exclusive lock 36 on the row 24. In such examples, the exclusive lock on the table 20 may prevent other transactions from being performed on the table 20 while the second transaction 50 holds the exclusive lock. Accordingly, lock escalation may be performed using the intent-exclusive table lock 40. The processor 12 may be further configured to release the exclusive lock on the table 20 subsequently to performing the second transaction 50.

Lock escalation may be performed as discussed above when the number of data locks or page locks acquired by a transaction exceeds a predetermined threshold number of data locks or page locks. For example, lock escalation may be performed when the number of data locks or page locks is greater than 5000. The use of TID locks may reduce the frequency with which lock escalation occurs by reducing the numbers of data locks acquired by transactions. Thus, TID locking may allow transactions to have greater concurrency.

Figure 3:
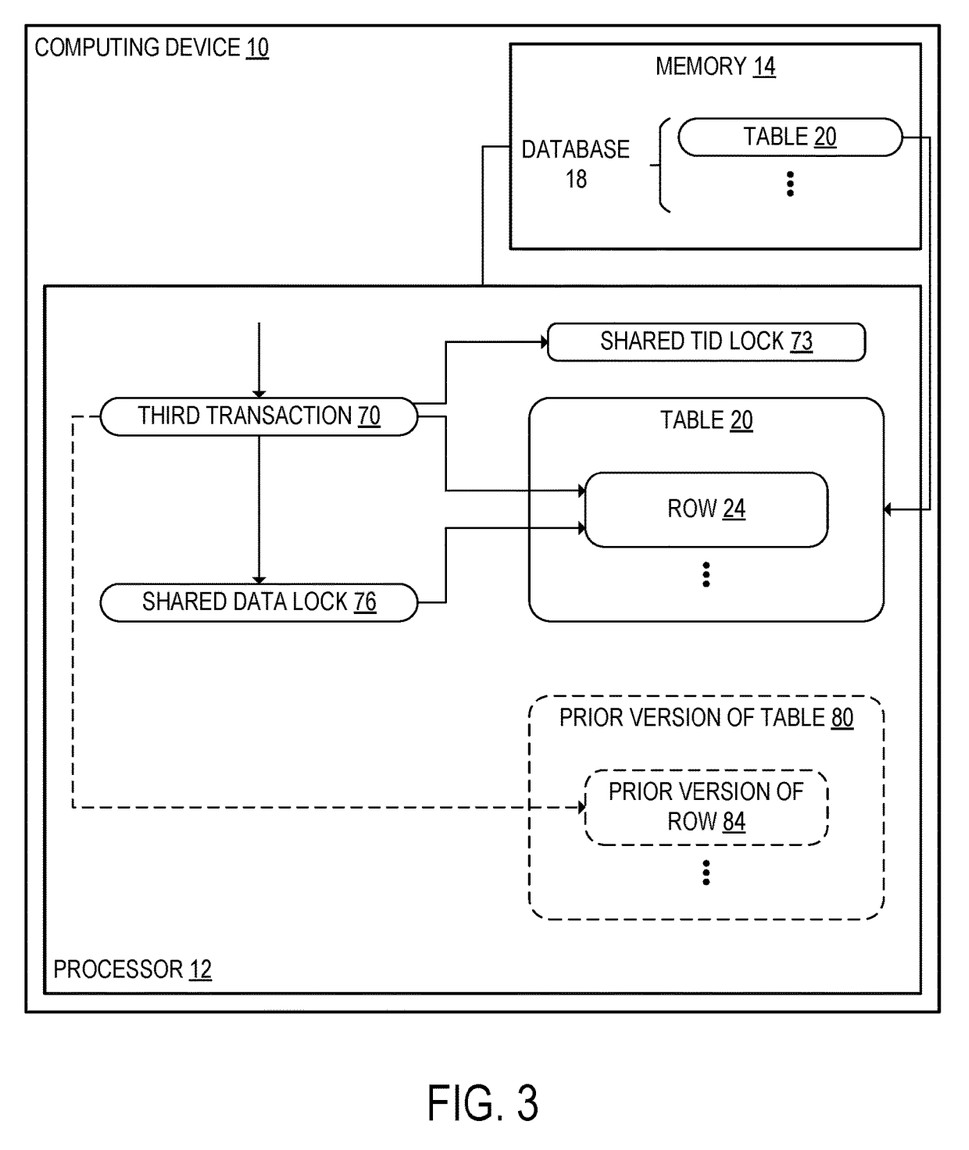
FIG. 3 shows the computing device when the processor receives a request to perform a read transaction as a third transaction, according to the example of FIG. 1.

In some examples, as depicted schematically in the example of FIG. 3, the processor 12 may be further configured to receive a request to perform a third transaction 70 on the row 24. The request to perform the third transaction 70 may be a request to read one or more entries 22 of the row 24 as one or more outputs to another program executed at the processor 12. The processor 12 may receive the request to perform the third transaction 70 prior to releasing the second exclusive data lock 56 on the row 24. Thus, the third transaction 70 may be concurrent with the second transaction 50. The processor 12 may, in some examples, be further configured to impose a shared TID lock 73 on the second TID 52 subsequently to releasing the second exclusive data lock 56.

In some examples, the third transaction 70 may be a read committed, repeatable read, or serializable read transaction. In such examples, in response to releasing the second exclusive TID lock 54, the processor 12 may be further configured to impose a shared data lock 76 on the row 24. The shared data lock 76 may be stored in the memory 14 at the lock manager 28. In examples in which the processor 12 imposes a shared TID lock 73 on the second TID 52, the processor 12 may be configured to impose the shared data lock 76 subsequently to imposing the shared TID lock 73. Subsequently to imposing the shared data lock 76 on the row 24, the processor 12 may be further configured to perform the third transaction 70 on the row 24. By imposing the shared data lock 76 on the row 24 while the third transaction 70 is performed, the processor 12 may be configured to enforce strict isolation on the third transaction 70.

In examples in which the third transaction 70 is a read committed transaction, the processor 12 may be further configured to release the shared data lock 76 in response to performing the third transaction 70 on the row. When the third transaction 70 is a repeatable read or serializable read transaction and is configured to be performed on one or more rows 24 of the table, the processor 12 may be configured to maintain the shared data lock 76 until the third transaction 70 has been performed on each of the one or more rows 24.

In other examples, the third transaction 70 may be a snapshot or read committed snapshot transaction. When the third transaction 70 is a snapshot or read committed snapshot transaction, in response to receiving the request to perform the third transaction 70, the processor 12 may be further configured to identify a prior version of the row 84 included in a prior version of the table 80. The prior version of the row 84 may be a version of the row 24 that was committed prior to performing the second transaction 50. The version of the row 24 may be indicated by the TID stored on the row 24. In response to identifying the prior version of the row 84, the processor 12 may be further configured to perform the third transaction 70 on the prior version of the row 84. Accordingly, when a read transaction is performed at a low isolation level (snapshot or read committed snapshot), that read transaction may return a prior version of the row 84 that was committed prior to performing one or more other transactions that are concurrent with the read transaction.

The third transaction 70 may alternatively be a read uncommitted transaction. In examples in which the third transaction 70 is a read uncommitted transaction, the processor 12 may be further configured to read a current version of the row 24 even though the transaction that has updated the row 24 to its current version has not finished. Thus, the third transaction 70 may be performed concurrently with the second transaction 50.

Figure 4:
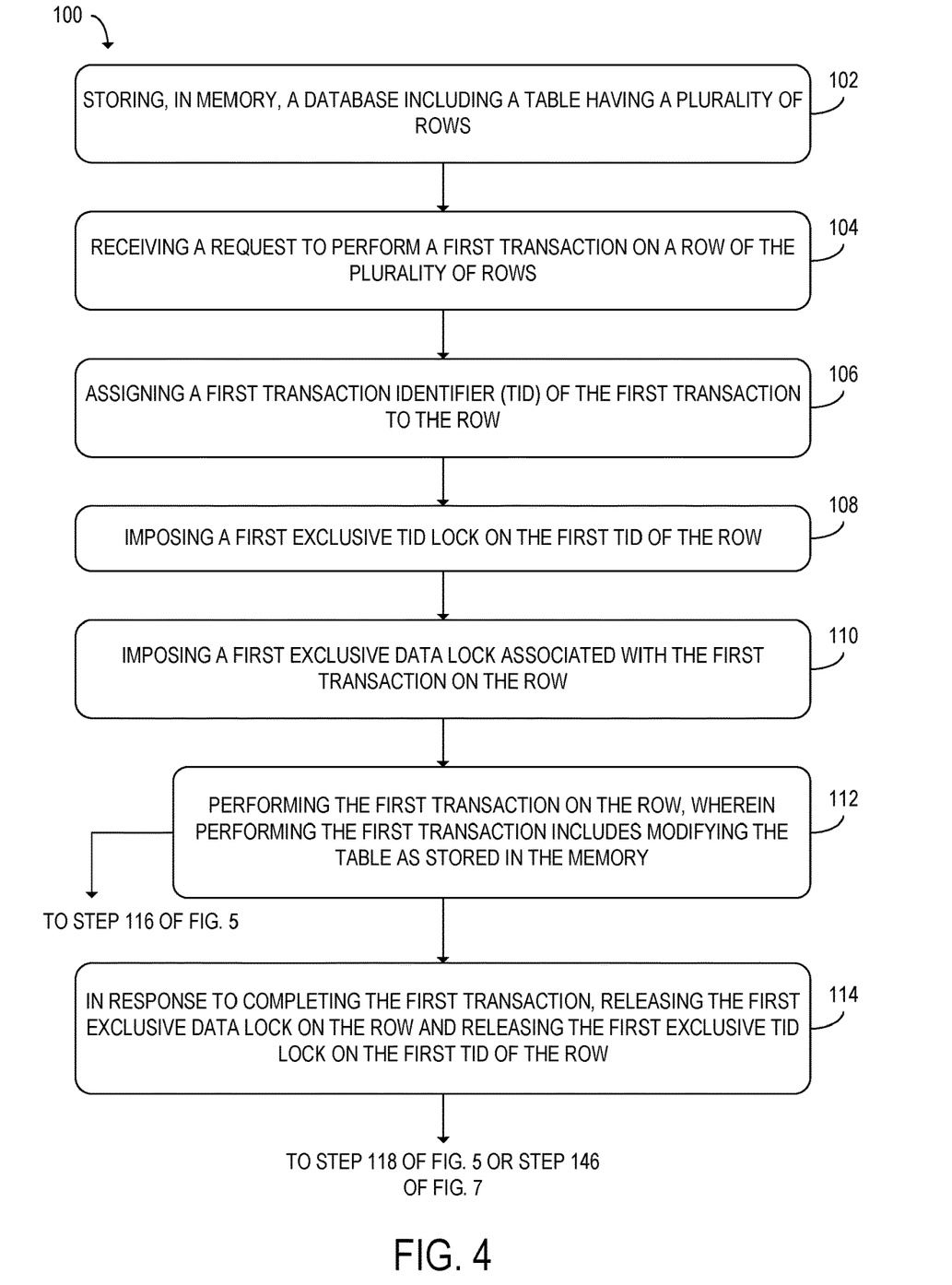
FIG. 4 shows a flowchart of an example method for use with a computing device when a request to perform a first transaction on a row of a table is received, according to the example of FIG. 1.

FIG. 4 shows a flowchart of a method 100 for use with a computing device, according to one example. The method 100 may, for example, be used with the computing device 10 of FIG. 1. The steps of the method 100 may be performed at least in part by a processor of the computing device. At step 102, the method 100 may include storing, in memory, a database including a table having a plurality of rows. In some examples, the database may include a plurality of tables. Each row of the table may include one or more entries.

At step 104, the method 100 may further include receiving a request to perform a first transaction on a row of the plurality of rows. For example, the first transaction may be configured to insert a row, delete a row, update the values of one or more of the entries included in the row, read one or more entries included in the row, or perform some other operation related to the row. The first transaction may be configured to be performed on one or more rows of the plurality of rows in some examples.

At step 106, the method 100 may further include assigning a first TID of the first transaction to the row. In examples in which the first transaction is configured to be performed on a plurality of rows of the table, the first TID may be assigned to each of the plurality of rows on which the transaction is configured to be performed. In addition, at step 108, the method 100 may further include imposing a first exclusive TID lock on the first TID of the row. The first exclusive TID lock may prevent other transactions from modifying the row that has the first TID while the first exclusive TID lock is held. At step 110, the method 100 may further include imposing a first exclusive data lock associated with the first transaction on the row. The first exclusive data lock may be configured to prevent other transactions from accessing the row while the first transaction holds the first exclusive data lock.

At step 112, the method 100 may further include performing the first transaction on the row. Performing the first transaction may include modifying the table as stored in the memory. In some examples, the entries included in the row may be modified when the first transaction is performed. Additionally or alternatively, the structure of the table may be modified, such as by inserting a new row above or below the row.

At step 114, in response to completing the first transaction, the method 100 may further include releasing the first exclusive data lock on the row. In addition, step 114 may further include releasing the first exclusive TID lock on the first TID of the row. Accordingly, when the first transaction has been completed, the row may be made available for modification by other transactions.

Figure 5:
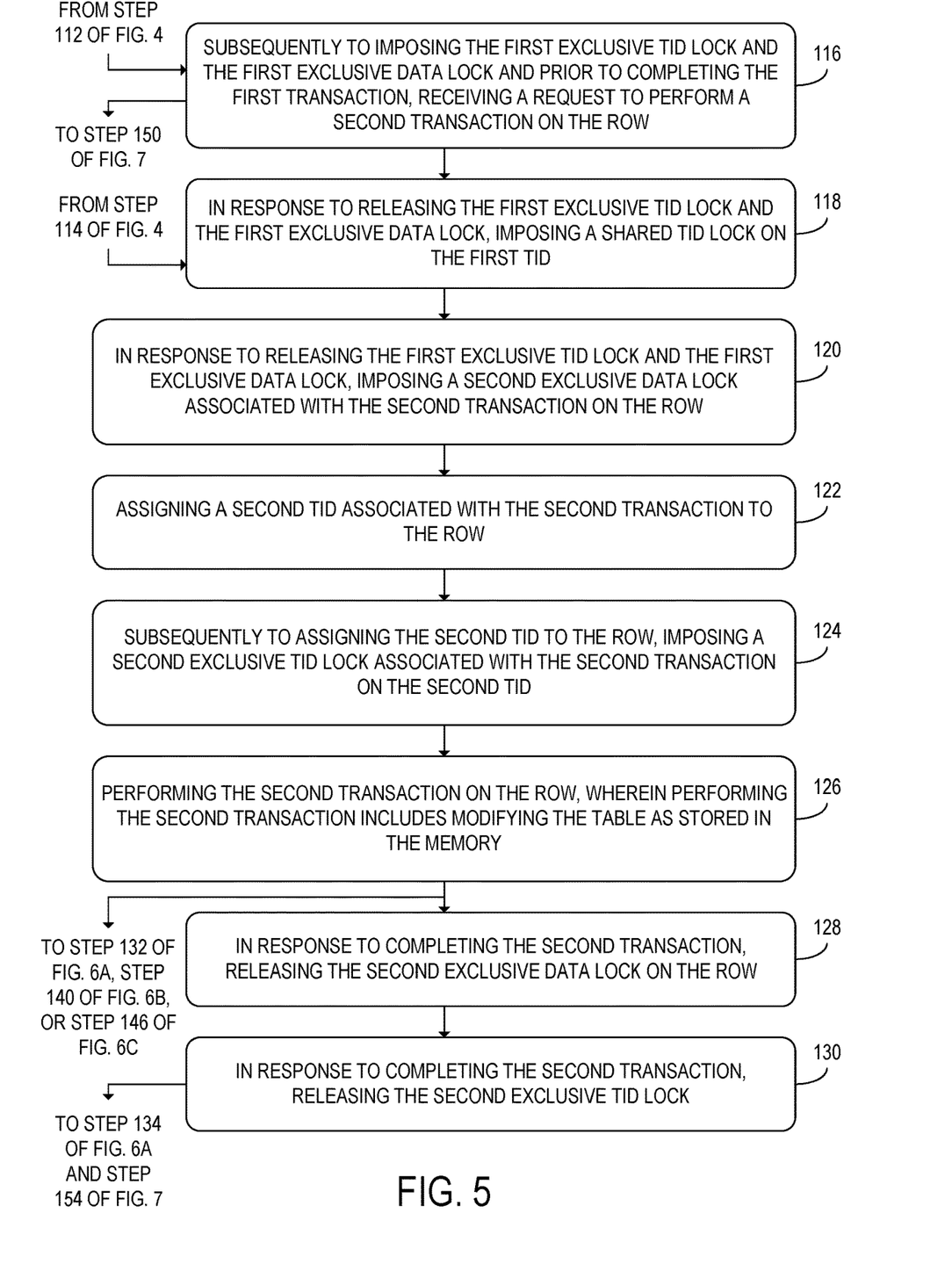
FIG. 5 shows additional steps of the method of FIG. 4 that may be performed in some examples when a request to perform a second transaction on the row is received.

FIG. 5 shows additional steps of the method 100 of FIG. 4 that may be performed in some examples. At step 116, the method 100 may further include receiving a request to perform a second transaction on the row. The request to perform the second transaction on the row may be received subsequently to imposing the first exclusive TID lock and the first exclusive row lock and prior to completing the first transaction. Accordingly, the processor may be configured to wait until the first transaction is completed in order to perform the second transaction. The request to perform the second transaction may, in some examples, include a request for a shared TID lock on the first TID associated with the row. In some examples, the first transaction and the second transaction may each have a serializable isolation level.

In examples in which the request to perform the second transaction includes a request for a shared TID lock on the first TID, the method 100 may further include, at step 118, imposing a shared TID lock on the first TID. The shared TID lock may be associated with the second transaction and may be imposed in response to releasing the first exclusive TID lock and the first exclusive data lock.

At step 120, the method 100 may further include imposing a second exclusive data lock associated with the second transaction on the row. Step 120 may be performed in response to releasing the first exclusive data lock on the row and the first exclusive TID lock on the first TID of the row at step 114. Thus, the second transaction may wait for the first exclusive TID lock and the first exclusive data lock to be released.

At step 122, in response to imposing the second exclusive data lock on the row, the method 100 may further include assigning a second TID associated with the second transaction to the row. In some examples, the second TID may overwrite the first TID. At step 124, the method 100 may further include imposing a second exclusive TID lock associated with the second transaction on the second TID. The second exclusive TID lock may be imposed subsequently to assigning the second TID to the row.

At step 126, the method 100 may further include performing the second transaction on the row. Performing the second transaction may include modifying the table as stored in the memory, which may include modifying one or more values of the one or more entries included in the row. Additionally or alternatively, performing the second transaction on the row may include modifying the structure of the table, such as by adding or deleting one or more rows.

At step 128, the method 100 may further include releasing the second exclusive data lock on the row in response to completing the second transaction. The method 100 may further include, at step 130, releasing the second exclusive TID lock on the second TID in response to completing the second transaction.

Figure 6A:
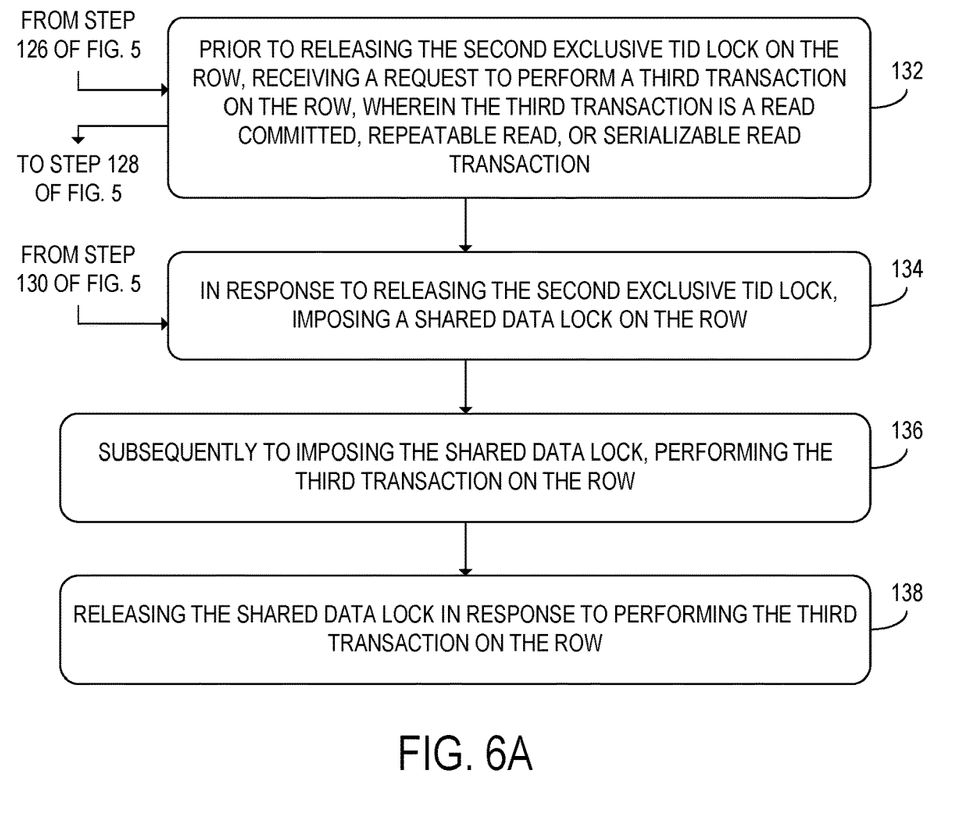
FIG. 6A shows additional steps of the method of FIG. 4 that may be performed in some examples when a request to perform a read committed, repeatable read, or serializable read transaction is received.
Figure 6B:
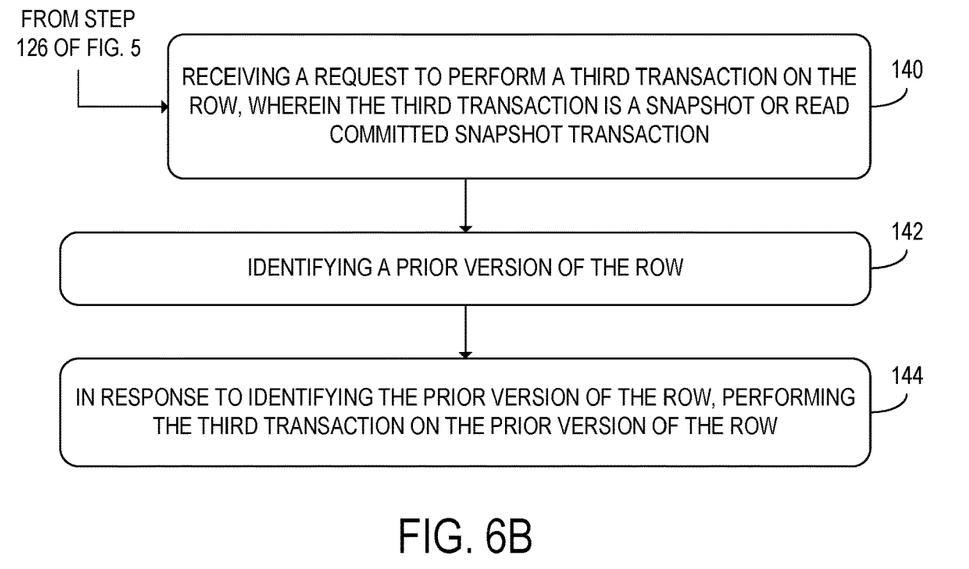
FIG. 6B shows additional steps of the method of FIG. 4 that may be performed in some examples when a request to perform a snapshot or read committed snapshot transaction is received.
Figure 6C:
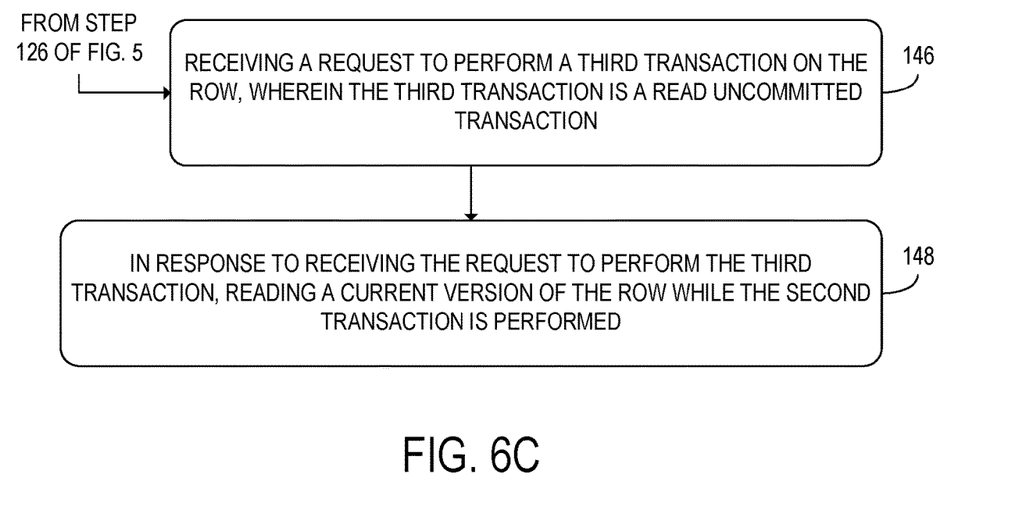
FIG. 6C shows additional steps of the method of FIG. 4 that may be performed in some examples when a request to perform a read uncommitted transaction is received.

FIGS. 6A-6C show additional steps of the method 100 that may be performed in examples in which a request to perform a read transaction as a third transaction is received. In the example of FIG. 6A, the method 100 may further include, at step 132, receiving a request to perform a third transaction. The request to perform the third transaction may be received prior to releasing the second exclusive TID lock on the row. The third transaction may be a read committed, repeatable read, or serializable read transaction. Thus, a high isolation level may be imposed for the third transaction. The third transaction may wait for the second exclusive TID lock to be released. In response to releasing the second exclusive TID lock, the method 100 may further include, at step 134, imposing a shared data lock on the row. In some examples, prior to imposing the shared data lock on the row, the third transaction may acquire a shared TID lock on the second TID.

At step 136, the method 100 may further include performing the third transaction on the row subsequently to imposing the shared data lock. In examples in which the third transaction is a read committed transaction, the shared data lock may be a short-duration shared lock. Thus, in such examples, the method 100 may further include, at step 138, releasing the shared data lock in response to performing the third transaction on the row. In examples in which the third transaction is a repeatable read or serializable read transaction that is performed on a plurality of rows, the shared data lock may be maintained until the third transaction has been performed on each row for which it is configured to be performed.

The steps of the method 100 shown in the example of FIG. 6B may each be performed prior to releasing the second exclusive lock on the row. In the example of FIG. 6B, the method 100 may further include, at step 140, receiving a request to perform a third transaction on the row. The third transaction may, in the example of FIG. 6B, be a snapshot or read committed snapshot transaction. Thus, the third transaction may be a read transaction with a low isolation level.

At step 142, the method 100 may further include identifying a prior version of the row. The prior version of the row may be a version of the row that was committed prior to performing the second transaction. In some examples, the version of the row may be indicated by the TID stored on the row. The TID stored on the row may indicate the committed version of the row that exists when the third transaction begins. Thus, the TIDs of the transactions may be used as version identifiers.

At step 144, the method 100 may further include performing the third transaction on the prior version of the row in response to identifying the prior version of the row. Accordingly, when the third transaction has a low isolation level, the prior version of the row may be read when a transaction configured to modify the row is in progress at the time at which the request to perform the third transaction is received.

Similarly to the steps shown in FIG. 6B, the steps of the method 100 shown in the example of FIG. 6C may each be performed prior to releasing the second exclusive TID lock on the row. At step 146, as shown in the example of FIG. 6C, the method 100 may further include receiving a request to perform a third transaction on a row. The third transaction may be a read uncommitted transaction.

At step 148, the method 100 may further include, in response to receiving the request to perform the third transaction, reading a current version of the row while the second transaction is performed. Accordingly, the row, as currently updated by the second transaction, may be read while the second transaction is still ongoing.

Figure 7:
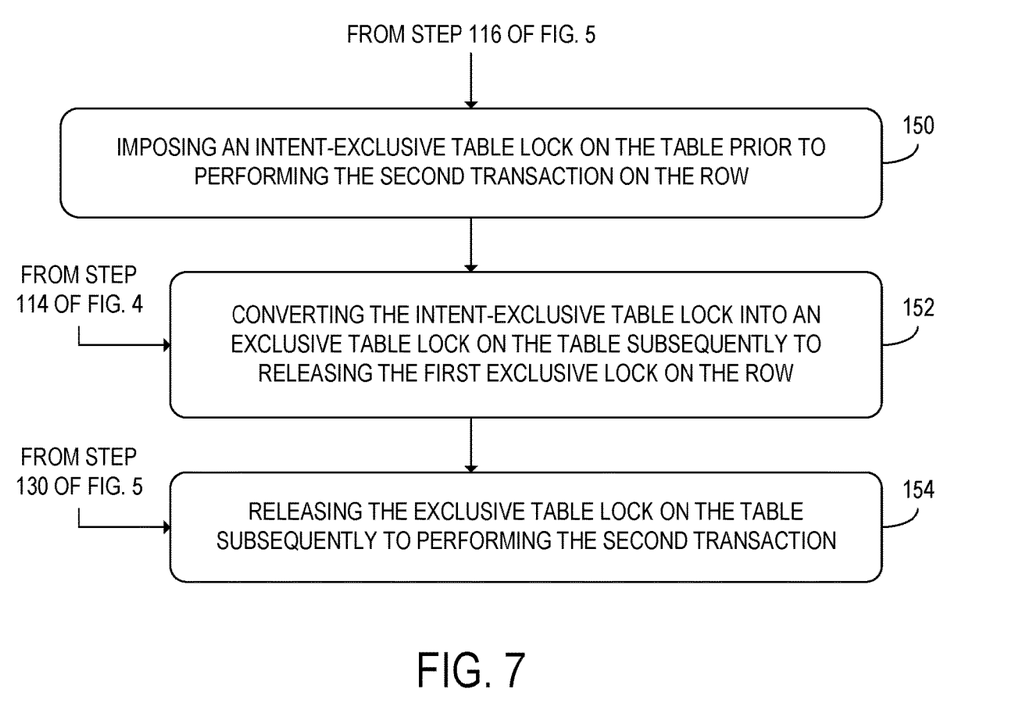
FIG. 7 shows additional steps of the method of FIG. 4 that may be performed in some examples when an intent-exclusive lock is imposed on the table.

FIG. 7 shows additional steps of the method 100 that may be performed in some examples. The steps of FIG. 7 may be performed subsequently to step 116 of FIG. 5. In the example of FIG. 7, the method 100 may further include, at step 150, imposing an intent-exclusive table lock on the table prior to performing the second transaction on the row. At step 152, the method 100 may further include converting the intent-exclusive table lock into an exclusive table lock on the table subsequently to releasing the first exclusive data lock on the row. Accordingly, lock escalation may be performed for the second transaction. At step 154, the method 100 may further include releasing the exclusive table lock on the table subsequently to performing the second transaction. The steps of FIG. 7 may be performed in examples in which the second transaction is performed on a number of rows greater than a predetermined threshold.

Using the systems and methods discussed above, the amount of memory used for storing locks when performing transactions at a relational database may be reduced. In addition, the systems and methods discussed above may prevent system-induced deadlocks that would otherwise occur due to differences in the orders in which different transactions acquire locks. TID locks may also allow for greater concurrency between transactions by acting as a replacement for lock escalation to the table level. The systems and methods discussed above also allow transactions to be performed more quickly by reducing a frequency at which the processor refers to a lock manager. In addition, the systems and methods discussed above may allow TID locking to be used with transactions that are performed at high isolation levels such as serializable, repeatable read, or read committed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
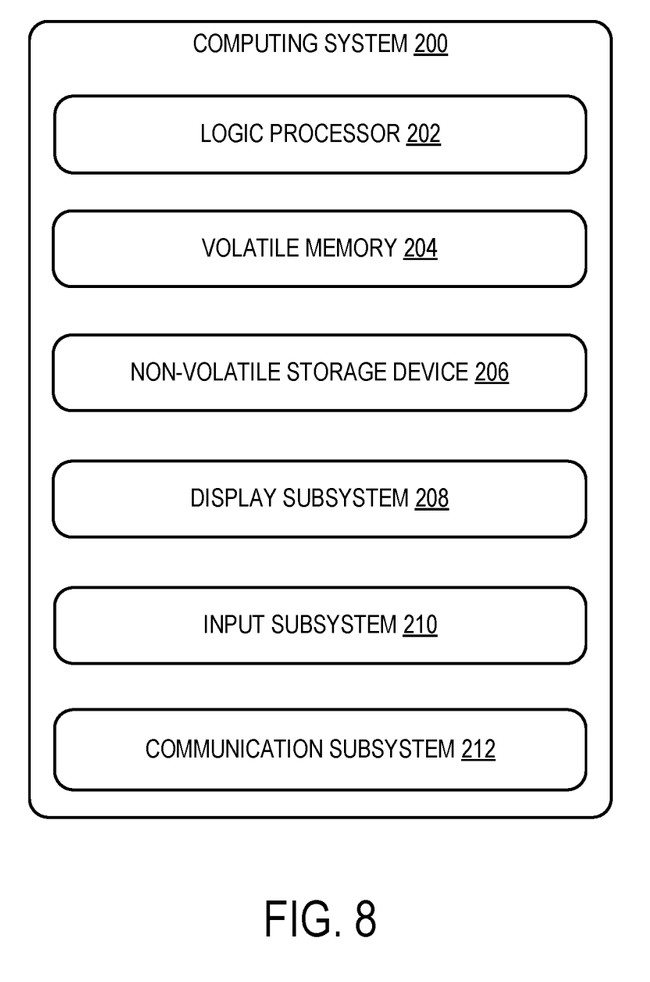
FIG. 8 shows a schematic view of an example computing system in which the computing device of FIG. 1 may be instantiated.

FIG. 8 schematically shows a non-limiting embodiment of a computing system 200 that can enact one or more of the methods and processes described above. Computing system 200 is shown in simplified form. Computing system 200 may embody the computing device 10 described above and illustrated in FIG. 1. Components of the computing system 200 may be instantiated in one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 200 includes a logic processor 202 volatile memory 204, and a non-volatile storage device 206. Computing system 200 may optionally include a display subsystem 208, input subsystem 210, communication subsystem 212, and/or other components not shown in FIG. 8.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 200 typically implemented in software by a processor to perform a particular function using portions of volatile memory, which function involves transformative processing that specially configures the processor to perform the function. Thus, a module, program, or engine may be instantiated via logic processor 202 executing instructions held by non-volatile storage device 206, using portions of volatile memory 204. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 208 may be used to present a visual representation of data held by non-volatile storage device 206. The visual representation may take the form of a graphical user interface (GUI). As the herein described methods and processes change the data held by the non-volatile storage device, and thus transform the state of the non-volatile storage device, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 212 may be configured to communicatively couple various computing devices described herein with each other, and with other devices. Communication subsystem 212 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 200 to send and/or receive messages to and/or from other devices via a network such as the Internet.

The following paragraphs discuss several aspects of the present disclosure. According to one aspect of the present disclosure, a computing device is provided, including non-volatile memory storing a database including a table having a plurality of rows. The computing device may further include a processor configured to receive a request to perform a first transaction on a row of the plurality of rows. The processor may be further configured to assign a first transaction identifier (TID) of the first transaction to the row. The processor may be further configured to impose a first exclusive TID lock on the first TID of the row. The processor may be further configured to impose a first exclusive data lock associated with the first transaction on the row. The processor may be further configured to perform the first transaction on the row. Performing the first transaction may include modifying the table as stored in the memory. In response to completing the first transaction, the processor may be further configured to release the first exclusive data lock on the row and release the first exclusive TID lock on the first TID of the row.

According to this aspect, the processor may be further configured to, subsequently to imposing the first exclusive TID lock and the first exclusive data lock and prior to completing the first transaction, receive a request to perform a second transaction on the row. In response to releasing the first exclusive TID lock and the first exclusive data lock, the processor may be further configured to impose a second exclusive data lock associated with the second transaction on the row. In response to imposing the second exclusive data lock on the row, the processor may be further configured to assign a second TID associated with the second transaction to the row. The processor may be further configured to perform the second transaction on the row. Performing the second transaction may include modifying the table as stored in the memory. In response to completing the second transaction, the processor may be further configured to release the second exclusive data lock on the row.

According to this aspect, subsequently to assigning the second TID to the row, the processor may be further configured to impose a second exclusive TID lock associated with the second transaction on the second TID. In response to completing the second transaction, the processor may be further configured to release the second exclusive TID lock.

According to this aspect, prior to releasing the second exclusive TID lock on the row, the processor may be further configured to receive a request to perform a third transaction on the row. The third transaction may be a read committed, repeatable read, or serializable read transaction. In response to releasing the second exclusive TID lock, the processor may be further configured to impose a shared data lock on the row. Subsequently to imposing the shared data lock, the processor may be further configured to perform the third transaction on the row.

According to this aspect, the third transaction may be a read committed transaction. The processor may be further configured to release the shared data lock in response to performing the third transaction on the row.

According to this aspect, prior to releasing the second exclusive data lock on the row, the processor may be further configured to receive a request to perform a third transaction on the row. The third transaction may be a snapshot or read committed snapshot transaction. The processor may be further configured to identify a prior version of the row. In response to identifying the prior version of the row, the processor may be further configured to perform the third transaction on the prior version of the row.

According to this aspect, prior to releasing the second exclusive data lock on the row, the processor may be further configured to receive a request to perform a third transaction on the row. The third transaction may be a read uncommitted transaction. In response to receiving the request to perform the third transaction, the processor may be further configured to read a current version of the row while the second transaction is performed.

According to this aspect, the processor may be further configured to impose an intent-exclusive table lock on the table prior to performing the second transaction on the row. The processor may be further configured to convert the intent-exclusive table lock into an exclusive table lock on the table subsequently to releasing the first exclusive data lock on the row. The processor may be further configured to release the exclusive table lock on the table subsequently to performing the second transaction.

According to this aspect, the first transaction and the second transaction may each have a serializable isolation level.

According to this aspect, the first exclusive data lock on the row may be a short-duration lock that is released in response to performing the first transaction on the row.

According to another aspect of the present disclosure, a method for use with a computing device is provided. The method may include storing, in memory, a database including a table having a plurality of rows. The method may further include receiving a request to perform a first transaction on a row of the plurality of rows. The method may further include assigning a first transaction identifier (TID) of the first transaction to the row. The method may further include imposing a first exclusive TID lock on the first TID of the row. The method may further include imposing a first exclusive data lock associated with the first transaction on the row. The method may further include performing the first transaction on the row. Performing the first transaction may include modifying the table as stored in the memory. In response to completing the first transaction, the method may further include releasing the first exclusive data lock on the row and releasing the first exclusive TID lock on the first TID of the row.

According to this aspect, the method may further include, subsequently to imposing the first exclusive TID lock and the first exclusive data lock and prior to completing the first transaction, receiving a request to perform a second transaction on the row. In response to releasing the first exclusive TID lock and the first exclusive data lock, the method may further include imposing a second exclusive data lock associated with the second transaction on the row. In response to imposing the second exclusive data lock on the row, the method may further include assigning a second TID associated with the second transaction to the row. The method may further include performing the second transaction on the row. Performing the second transaction may include modifying the table as stored in the memory. In response to completing the second transaction, the method may further include releasing the second exclusive data lock on the row.

According to this aspect, subsequently to assigning the second TID to the row, the method may further include imposing a second exclusive TID lock associated with the second transaction on the second TID. In response to completing the second transaction, the method may further include releasing the second exclusive TID lock.

According to this aspect, prior to releasing the second exclusive TID lock on the row, the method may further include receiving a request to perform a third transaction on the row. The third transaction may be a read committed, repeatable read, or serializable read transaction. In response to releasing the second exclusive TID lock, the method may further include imposing a shared data lock on the row. Subsequently to imposing the shared data lock, the method may further include performing the third transaction on the row.

According to this aspect, the third transaction may be a read committed transaction. The method may further include releasing the shared data lock in response to performing the third transaction on the row.

According to this aspect, prior to releasing the second exclusive lock on the row, the method may further include receiving a request to perform a third transaction on the row. The third transaction is a snapshot or read committed snapshot transaction. The method may further include identifying a prior version of the row. In response to identifying the prior version of the row, the method may further include performing the third transaction on the prior version of the row.

According to this aspect, prior to releasing the second exclusive data lock on the row, the method may further include receiving a request to perform a third transaction on the row. The third transaction may be a read uncommitted transaction. In response to receiving the request to perform the third transaction, the method may further include reading a current version of the row while the second transaction is performed.

According to this aspect, the method may further include imposing an intent-exclusive table lock on the table prior to performing the second transaction on the row. The method may further include converting the intent-exclusive table lock into an exclusive table lock on the table subsequently to releasing the first exclusive data lock on the row. The method may further include releasing the exclusive table lock on the table subsequently to performing the second transaction.

According to this aspect, the first exclusive data lock on the row may be a short-duration lock that is released in response to performing the first transaction on the row.

According to another aspect of the present disclosure, a computing device is provided, including non-volatile memory storing a database including a table having a plurality of rows. The computing device may further include a processor configured to receive a request to perform a transaction on two or more rows of the plurality of rows. The processor may be further configured to assign a transaction identifier (TID) of the transaction to each of the two or more rows. The processor may be further configured to impose an exclusive TID lock on the TID of the two or more rows. For each row of the two or more rows, the processor may be further configured to impose a respective exclusive data lock associated with the transaction on the row. The processor may be further configured to perform the transaction on the row. Performing the transaction may include modifying the table as stored in the memory non-volatile memory. The processor may be further configured to release the respective exclusive data lock on the row. In response to completing the transaction, the processor may be further configured to release the exclusive TID lock on the TID of the two or more rows.

"And/or" as used herein is defined as the inclusive or $\lor$, as specified by the following truth table:

| A | B | A $\lor$ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device comprising:
non-volatile memory storing a database including a table having a plurality of rows; and
a processor configured to:
receive a request to perform a first transaction on a row of the plurality of rows;
assign a first transaction identifier (TID) of the first transaction to the row;
impose a first exclusive TID lock on the first TID of the row;
impose a first exclusive data lock associated with the first transaction on the row;
perform the first transaction on the row, wherein performing the first transaction includes modifying the table as stored in the memory;
subsequently to imposing the first exclusive TID lock and the first exclusive data lock and prior to completing the first transaction, receive a request to perform a second transaction on the row and prevent the second transaction from being performed on the row while the first exclusive TID lock and first exclusive data lock are held;
in response to completing the first transaction:
release the first exclusive data lock on the row; and
release the first exclusive TID lock on the first TID of the row;
in response to releasing the first exclusive TID lock and the first exclusive data lock, impose a second exclusive data lock associated with the second transaction on the row;
in response to imposing the second exclusive data lock on the row, assign a second TID associated with the second transaction to the row;
perform the second transaction on the row, wherein performing the second transaction includes modifying the table as stored in the memory; and in response to completing the second transaction, release the second exclusive data lock on the row.

2. The computing device of claim 1, wherein the processor is further configured to:
subsequently to assigning the second TID to the row, impose a second exclusive TID lock associated with the second transaction on the second TID; and
in response to completing the second transaction, release the second exclusive TID lock.

3. The computing device of claim 2, wherein the processor is further configured to:
prior to releasing the second exclusive TID lock on the row, receive a request to perform a third transaction on the row, wherein the third transaction is a read committed, repeatable read, or serializable read transaction;
in response to releasing the second exclusive TID lock, impose a shared data lock on the row; and
subsequently to imposing the shared data lock, perform the third transaction on the row.

4. The computing device of claim 3, wherein:
the third transaction is a read committed transaction; and
the processor is further configured to release the shared data lock in response to performing the third transaction on the row.

5. The computing device of claim 1, wherein, prior to releasing the second exclusive data lock on the row, the processor is further configured to:
receive a request to perform a third transaction on the row, wherein the third transaction is a snapshot or read committed snapshot transaction;
identify a prior version of the row; and
in response to identifying the prior version of the row, perform the third transaction on the prior version of the row.

6. The computing device of claim 1, wherein, prior to releasing the second exclusive data lock on the row, the processor is further configured to:
receive a request to perform a third transaction on the row, wherein the third transaction is a read uncommitted transaction; and
in response to receiving the request to perform the third transaction, read a current version of the row while the second transaction is performed.

7. The computing device of claim 1, wherein the processor is further configured to:
impose an intent-exclusive table lock on the table prior to performing the second transaction on the row;
convert the intent-exclusive table lock into an exclusive table lock on the table subsequently to releasing the first exclusive data lock on the row; and
release the exclusive table lock on the table subsequently to performing the second transaction.

8. The computing device of claim 1, wherein the first transaction and the second transaction each have a serializable isolation level.

9. The computing device of claim 1, wherein the first exclusive data lock on the row is a short-duration lock that is released in response to performing the first transaction on the row.

10. A method for use with a computing device, the method comprising:
storing, in memory, a database including a table having a plurality of rows;
receiving a request to perform a first transaction on a row of the plurality of rows;
assigning a first transaction identifier (TID) of the first transaction to the row;
imposing a first exclusive TID lock on the first TID of the row;
imposing a first exclusive data lock associated with the first transaction on the row;
performing the first transaction on the row, wherein performing the first transaction includes modifying the table as stored in the memory;
subsequently to imposing the first exclusive TID lock and the first exclusive data lock and prior to completing the first transaction, receiving a request to perform a second transaction on the row and prevent the second transaction from being performed on the row while the first exclusive TID lock and first exclusive data lock are held;
in response to completing the first transaction:
releasing the first exclusive data lock on the row; and
releasing the first exclusive TID lock on the first TID of the row;
in response to releasing the first exclusive TID lock and the first exclusive data lock, imposing a second exclusive data lock associated with the second transaction on the row;
in response to imposing the second exclusive data lock on the row, assigning a second TID associated with the second transaction to the row;
performing the second transaction on the row, wherein performing the second transaction includes modifying the table as stored in the memory; and
in response to completing the second transaction, releasing the second exclusive data lock on the row.

11. The method of claim 10, further comprising:
subsequently to assigning the second TID to the row, imposing a second exclusive TID lock associated with the second transaction on the second TID; and
in response to completing the second transaction, releasing the second exclusive TID lock.

12. The method of claim 11, further comprising:
prior to releasing the second exclusive TID lock on the row, receiving a request to perform a third transaction on the row, wherein the third transaction is a read committed, repeatable read, or serializable read transaction;
in response to releasing the second exclusive TID lock, imposing a shared data lock on the row; and
subsequently to imposing the shared data lock, performing the third transaction on the row.

13. The method of claim 12, wherein:
the third transaction is a read committed transaction; and
the method further comprises releasing the shared data lock in response to performing the third transaction on the row.

14. The method of claim 10, further comprising, prior to releasing the second exclusive lock on the row:
receiving a request to perform a third transaction on the row, wherein the third transaction is a snapshot or read committed snapshot transaction;
identifying a prior version of the row; and
in response to identifying the prior version of the row, performing the third transaction on the prior version of the row.

15. The method of claim 10, further comprising, prior to releasing the second exclusive data lock on the row:
receiving a request to perform a third transaction on the row, wherein the third transaction is a read uncommitted transaction; and in response to receiving the request to perform the third transaction, reading a current version of the row while the second transaction is performed.

16. The method of claim 10, further comprising:
imposing an intent-exclusive table lock on the table prior to performing the second transaction on the row;
converting the intent-exclusive table lock into an exclusive table lock on the table subsequently to releasing the first exclusive data lock on the row; and
releasing the exclusive table lock on the table subsequently to performing the second transaction.

17. The method of claim 10, wherein the first exclusive data lock on the row is a short-duration lock that is released in response to performing the first transaction on the row.

18. A computing device comprising:
non-volatile memory storing a database including a table having a plurality of rows; and
a processor configured to:
   receive a request to perform a first transaction on two or more rows of the plurality of rows;
   assign a first transaction identifier (TID) of the first transaction to each of the two or more rows;
   impose an exclusive TID lock on the first TID of the two or more rows;
   for each row of the two or more rows:
      impose a first exclusive data lock associated with the first transaction on the row;
      perform the first transaction on the row, wherein performing the first transaction includes modifying the table as stored in the non-volatile memory;
      subsequently to imposing the exclusive TID lock and the first exclusive data lock and prior to completing the first transaction, receive a request to perform a second transaction on the row and prevent the second transaction from being performed on the row while the exclusive TID lock and first exclusive data lock are held;
      release the first exclusive data lock on the row;
      in response to releasing the exclusive TID lock and the first exclusive data lock, impose a second exclusive data lock associated with the second transaction on the row;
      in response to imposing the second exclusive data lock on the row, assign a second TID associated with the second transaction to the row;
      perform the second transaction on the row, wherein performing the second transaction includes modifying the table as stored in the memory;
      in response to completing the second transaction, release the second exclusive data lock on the row; and
   in response to completing the first transaction, release the exclusive TID lock on the first TID of the two or more rows.

\* \* \* \* \*